(12) United States Patent
Annen et al.

(10) Patent No.: US 10,502,560 B2
(45) Date of Patent: Dec. 10, 2019

(54) OPTOELECTRONIC MEASURING DEVICE HAVING MAGNETIC COMPASS AND COMPENSATION FUNCTIONALITY

(71) Applicant: Safran Vectronix AG, Heerbrugg (CH)

(72) Inventors: Ivo Annen, Schindellegi (CH); Silvio Gnepf, Heerbrugg (CH)

(73) Assignee: Safran Vectronix AG, Heerbrugg (CH)

( * ) Notice: Subject to any disclaimer, the term of this patent is extended or adjusted under 35 U.S.C. 154(b) by 287 days.

(21) Appl. No.: 15/602,612

(22) Filed: May 23, 2017

(65) Prior Publication Data

US 2017/0343339 A1    Nov. 30, 2017

(30) Foreign Application Priority Data

May 24, 2016    (EP) .................................... 16171143

(51) Int. Cl.
| | |
|---|---|
| *G01B 11/27* | (2006.01) |
| *G01C 17/38* | (2006.01) |
| *G01C 21/08* | (2006.01) |
| *G01V 7/06* | (2006.01) |

(52) U.S. Cl.
CPC ............ *G01B 11/272* (2013.01); *G01C 17/38* (2013.01); *G01C 21/08* (2013.01); *G01V 7/06* (2013.01)

(58) Field of Classification Search
CPC ........ G01C 17/38; G01C 21/08; G01C 17/26; G01B 11/272
USPC ......................................................... 33/334
See application file for complete search history.

(56) References Cited

U.S. PATENT DOCUMENTS

| | | | |
|---|---|---|---|
| 4,949,089 A | 8/1990 | Ruszkowski, Jr. | |
| 6,701,631 B1* | 3/2004 | Monteiro | G01C 17/00 33/1 E |
| 7,325,320 B2 | 2/2008 | Gnepf et al. | |
| 9,918,044 B2* | 3/2018 | Kirschner | G01C 17/38 |

(Continued)

FOREIGN PATENT DOCUMENTS

DE        19609762 C1    4/1997

OTHER PUBLICATIONS

EP 16 17 1143, European Search Report, dated Nov. 23, 2016, pp. 1-5.

*Primary Examiner* — Yaritza Guadalupe-McCall
(74) *Attorney, Agent, or Firm* — Muncy, Geissler, Olds & Lowe, P.C.

(57) ABSTRACT

Disclosed is an optoelectronic measuring device having an electronic magnetic compass for determining an azimuthal alignment of the measuring device and a compensation unit, which is associated with the magnetic compass, for compensating for device-fixed interference fields, wherein the measuring device assumes at least two defined, repeatable operating states, has a different device-fixed interference field in each of the operating states, and the compensation unit carries out an initial compensation of the electronic magnetic compass in a first operating state of the measuring device, wherein the compensation unit has a detection unit for detecting a present operating state, a memory unit for storing a magnetic offset resulting from the different device-fixed interference fields between the first and a second operating state of the measuring device, and a computer unit for computing the azimuthal alignment of the measuring device depending on an ascertained operating state and based on the magnetic offset.

15 Claims, 5 Drawing Sheets

(56) References Cited

U.S. PATENT DOCUMENTS

| | | | |
|---|---|---|---|
| 2005/0229411 A1* | 10/2005 | Gnepf | F41G 3/02 |
| | | | 33/356 |
| 2007/0233381 A1 | 10/2007 | Okeya | |
| 2011/0106474 A1 | 5/2011 | Kulik et al. | |
| 2012/0070137 A1 | 3/2012 | Watanabe | |
| 2013/0192072 A1* | 8/2013 | Gnepf | G01B 11/26 |
| | | | 33/228 |
| 2015/0012234 A1* | 1/2015 | Annen | G01C 17/38 |
| | | | 702/93 |
| 2015/0296185 A1* | 10/2015 | Kirschner | G01C 17/38 |
| | | | 348/116 |
| 2017/0010127 A1* | 1/2017 | Annen | G08B 29/14 |
| 2017/0211934 A1* | 7/2017 | Pavlis | G01C 17/02 |
| 2017/0343339 A1* | 11/2017 | Annen | G01B 11/272 |
| 2018/0245918 A1* | 8/2018 | Gnepf | G01C 17/38 |

* cited by examiner

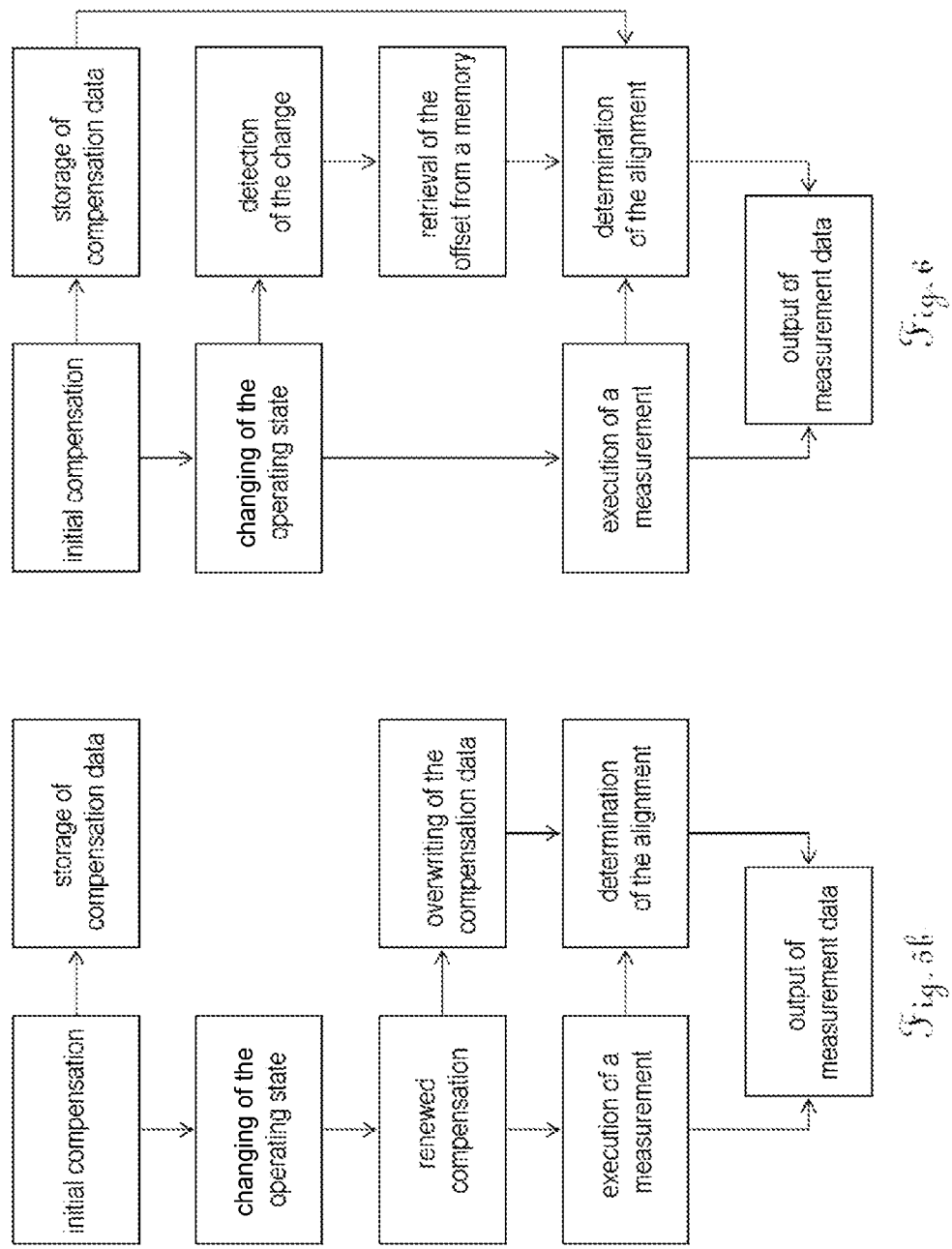

OPTOELECTRONIC MEASURING DEVICE HAVING MAGNETIC COMPASS AND COMPENSATION FUNCTIONALITY

CROSS REFERENCE TO RELATED APPLICATION

This application claims priority to European Patent Application No.: 16171143.7 which was filed in Europe on May 24, 2016, and which is herein incorporated by reference in its entirety.

BACKGROUND

The invention relates to an optoelectronic measuring device, in particular an aiming device, having an electronic magnetic compass for determining the azimuthal alignment of the measuring device and also a method for determining an azimuthal alignment of such an optoelectronic measuring device. In particular, the invention relates to an automatic compensation of device-fixed hard-magnetic interfering influences as a result of different operating states of the measuring device.

Such measuring devices are used, for example in object recording and data collection for geographical information systems (GIS), for determining coordinates of remote objects. Such measuring devices can also be designed as portable aiming devices, which are used in particular in coordinate determinations of military target objects, for example as described in U.S. Pat. No. 7,325,320 B2.

Such a determination of target coordinates requires the relative coordinates between the measuring device and the target object. For this purpose, the aiming device is aligned on the target object and then the azimuthal and the zenithal alignment of the aiming device in relation to the Earth are determined. The determined angle values can then be provided together with a typical accuracy value in each case at a data interface of the aiming device for transmission to a fire control unit. Fire action can then be introduced into a region associated with the transmitted target coordinates by the fire control unit via a fire unit.

The magnetic compass is the critical component with respect to the achievable accuracy of the target coordinates to be determined. On the one hand, the effect of a fire action to be introduced onto the target object and, on the other hand, the probability of collateral damage may be judged on the basis of the transmitted accuracy value of the azimuthal alignment. In the event of a substantial deviation between the effective and the predetermined typical accuracy value, this judgment can be incorrect.

Substantial caution is also still indicated when determining azimuthal alignments using an electronic magnetic compass, although the components of the magnetic and gravitational fields are measurable per se with sufficient device accuracy. As is known from U.S. Pat. No. 4,949,089, the declination of the Earth's magnetic field from the geographical north direction may also be taken into consideration nowadays practically automatically by means of the "magnetic variation compensation" implemented in military GPS receivers. However, because the measured magnetic field generally includes, in addition to the Earth's magnetic field, which is the carrier of the north direction information, magnetic interference fields overlaid thereon, the azimuthal alignment in relation to the geographical north direction can nonetheless often only be determined with very restricted accuracy and reliability, which can be a multiple of the device accuracy alone.

These magnetic interference fields comprise so-called location-fixed interference fields associated with the measuring location and so-called device-fixed interference fields which originate from electrical currents and also hard-magnetic and soft-magnetic materials of the device, in which the magnetic compass is installed. Location-fixed interference fields are additionally differentiated into interference fields of regional scale and interference fields of local scale.

Interference fields of regional scale, so-called anomalies of the Earth's magnetic field, generally originate from natural interfering influences, for example large-scale deposits of iron ore. These interference fields are homogeneous when observed at a local scale and cause a constant azimuthal error locally in comparison to the declination of the Earth's magnetic field.

Interference fields of local scale, in contrast, originate from objects created by the human hand, for example railway tracks, water lines or overhead power lines, pipelines or structures made of steel and steel-reinforced concrete. Quasi-stationary objects, such as parked vehicles or weapon systems moved into position, also cause magnetic interference fields of local scale. These interference fields are inhomogeneous when observed at a local scale and also cause varying azimuthal errors, which can also disappear at some locations, within measuring spaces having dimensions of meters.

A variety of different methods is known from the prior art which enable magnetic interfering influences in magnetic compasses to be compensated for. As is known, for example, from DE 196 09 762 C1, device-fixed interference fields of a device having an electronic magnetic compass, which has sensors for three-dimensional measurement of a magnetic field and gravitational field, may be compensated for arithmetically in the determination of azimuthal alignments of the device by means of a vector equation. The parameters of the vector equation have to be determined beforehand by means of an optimization method. This optimization method is based on values of a more or less rigidly predetermined sequence of measurements of the magnetic and gravitational fields at a measurement location. In this case, the device is aligned differently in space in each case during each of these measurements. In this manner, however, location-fixed magnetic interference fields cannot be compensated for or detected at the measurement location.

Hard-magnetic materials and currents add a further offset to the magnetic field values which are ascertained by the magnetic compass. If the offset originates from currents, it is thus proportional thereto. A general correction of N offset sources is given by $$\Delta o = \sum_{j=1}^{N} (f_1 - f_{jc})\Delta_j$$

wherein $\Delta_o$ and $\Delta_j$ are 3×1 vectors, $f_j$ are the present system state values, and $f_{jc}$ are the system state values during the last compensation.

$\Delta_j$ can be ascertained at a mechanically and magnetically stable location by measuring the difference between the total magnetic fields with current turned on and off, and/or in the case of the hard-magnetic component at a first and second position (for example, a switch in on and off positions). "Off" and "on" or position 1 and position 2, respectively, can be converted in this case into the state variables 0 and 1; in the case of a current having the strengths $I_1$ and $I_2$ into $I_j \times$ scaling factor.

First measurement: $b_{t1} = b_E + b_0 + b_1 + e_1$, value of the state variable: $f_1$, Second measurement: $b_{t2} = b_E + b_0 + b_2 + e_2$, value of the state variable: $f_2$, wherein:
$b_E$: 3×1 vector, Earth's magnetic field of the surroundings (is assumed to be constant),
$b_0$: 3×1 vector, effect of the other hard-magnetic components of the system,
$b_j$: 3×1 vectors, the hard-magnetic offset which is to be measured in the situations j=1, 2,
$e_j$: 3×1 vectors, noise.

The following equation then applies:

$$\Delta = (b_2 - b_1)/(f_2 - f_1) = (b_{t2} - b_{t1})/(f_2 - f_1).$$

If one assumes that the noise is uncorrelated and (simplified) has the same standard deviation in all three components, i.e., $\langle e_i e_i^T \rangle = s^2 * I_3$, $\langle e_i e_j^T \rangle = 0$, $i \neq j$, wherein $\langle \rangle$ is an experiential value (average of infinitely many measurements) and $I_3$ is a 3×3 identity matrix, the standard deviation of $\Delta$ is given by:

$$\langle (e_2-e_1)(e_2-e_1)^T \rangle/(f_2-f_1)^2 = (\langle e_2 e_2^T \rangle + \langle e_1 e_1^T \rangle)/(f_2-f_1)^2 = (s_1^2+s_2^2)/(f_2-f_1)^2 * I_3 = s_\Box^2 * I_3$$

The estimated system accuracy having offset correction is then given by:

$$s_{\Delta o}^2 = acc^2 + \sum_{j=1}^{N} (f_j - f_{jc})^2 s_{\Delta f}^2,$$

wherein acc is the estimated accuracy in the last compensation, and $s_{\Delta j}$ is the estimated accuracy of the compensation offset.

As a consequence, the additional error is greatest when all present states deviate maximally from the states at the time of the last compensation.

An optoelectronic measuring device of the type in question having a magnetic compass and a compensation functionality for it is described, for example, in US 2015/0012234 A1.

To at least reduce or preferably entirely eliminate magnetic interfering influences, a compensation is unavoidable. In this case, different compensation options exist for different interference sources. If the magnetic conditions of a device having installed magnetic compass change after compensation has already been performed, a new compensation thus necessarily has to be carried out.

However, the problem often occurs that the user does not carry out the actually required compensation, whereby the accuracy of the compass is reduced. Omitting the renewed compensation results in this case either from a lack of time, from the lack of knowledge of the respective user that a further compensation is necessary, or—because the method is frequently considered to be cumbersome—from convenience. To also ensure the reliability of the measurements under time pressure or in the case of less experienced users, it would therefore be advantageous if the number of the compensations to be executed could be reduced, and/or if the user no longer had to carry out further compensations after an initial compensation, solely because the magnetic state of the device was changed.

It is therefore an object of the invention to provide an improved optoelectronic measuring device having a magnetic compass, and also an improved method for determining an azimuthal alignment of such an optoelectronic measuring device.

A further object of the invention is to provide such a measuring device and method having an improved handling capability for a user, in particular wherein a measurement can be carried out more rapidly and with less effort.

A further object of the invention is to provide such a measuring device and method having a lesser susceptibility to error.

A further object is to provide such a measuring device which can be embodied as lighter and smaller, in particular with respect to a shielding of the magnetic compass in relation to other components of the measuring device.

In particular, it is an object to provide such a measuring device and method in which, after an initial compensation, no further compensation has to be carried out, if the device-fixed magnetic interference field changes.

At least one of these objects is achieved according to the invention by an optoelectronic measuring device having the features of Patent Claim 1, or the method having the features of Claim 9, respectively. Further alternative or advantageous embodiments or refinements of the invention are described in the dependent patent claims.

If a measuring device has multiple possible states, which each have a different device-fixed magnetic interference field, thus, according to the present invention, the magnetic offset between these states can be determined fully automatically.

A first aspect of the invention relates to an optoelectronic measuring device having an electronic magnetic compass for determining an azimuthal alignment of the measuring device and a compensation unit, which is associated with the magnetic compass, for compensating for device-fixed interference fields. In this case, the measuring device is adapted to assume at least two defined, repeatable operating states, wherein the measuring device has a different device-fixed interference field in each of the operating states, and the compensation unit has a compensation functionality for carrying out an initial compensation of the electronic magnetic compass in a first operating state of the measuring device. According to the invention, the compensation unit has a detection unit for detecting a present operating state of the measuring device, a memory unit for storing a magnetic offset resulting from the different device-fixed interference fields between the first operating state and a second operating state of the measuring device, and a computer unit for computing the azimuthal alignment of the measuring device depending on an ascertained operating state and based on the magnetic offset.

According to one embodiment, the measuring device is a handheld optoelectronic observation device. It has in particular a display unit for displaying measurement data, for example the azimuthal alignment, and/or an interface for providing a signal which comprises information about the azimuthal alignment for an external receiver, in particular a geographical information system, a military fire control unit, or a handheld data processing device.

According to a further embodiment, the measuring device according to the invention has at least one activatable electrical system, wherein the first and the second operating state of the measuring device differ from one another at least with respect to a present state of the electrical system, in particular in that the electrical system of the measuring device is turned on or off, and wherein the detection unit is designed to recognize a present state of the electrical system.

The activatable electrical system is in this case in particular a night vision system or a display unit, in particular having an LCD display screen, has a brightness regulator, or is a GPS module or a Bluetooth module.

In one embodiment, the first and the second operating state of the measuring device differ from one another in a present current strength and/or voltage in the electrical system, and the detection unit is designed to ascertain a present current strength or voltage, respectively, in the electrical system.

According to a further embodiment, the measuring device according to the invention has at least one hard-magnetic component, which is adapted to assume at least two different positions in or on the measuring device, wherein the first and the second operating state differ from one another in that the hard-magnetic component has a different position in each case. In this case, the hard-magnetic component is in particular a mechanical switch, in particular a toggle, rotating, or sliding switch to be actuated by a user, or an element movable in a motorized manner, in particular an optical element movable in the scope of a zoom procedure.

In a further embodiment of the measuring device according to the invention, the compensation unit is designed, in the scope of the compensation functionality, to instruct a user of the measuring device to execute the initial compensation, in particular by means of an output of handling instructions on a display unit of the measuring device.

According to a further embodiment, the magnetic compass has at least three measuring sensors arranged fixedly on the device for measuring a magnetic field and the direction of the gravitational field.

According to a further embodiment, the measuring device has a different hard-magnetic device-fixed interference field in each case in the first and in the second operating state.

A second aspect of the invention relates to a method for determining an azimuthal alignment of an optoelectronic measuring device, wherein the measuring device has a magnetic compass and is adapted to assume a plurality of defined, repeatable operating states each having a different device-fixed interference field. The method comprises an initial compensation of the electronic magnetic compass in a first operating state of the measuring device, and also a determination of the azimuthal alignment of the measuring device by means of the magnetic compass in a second operating state of the measuring device. According to the invention, the method additionally comprises an automatic recognition of the first operating state and the second operating state and an automatic provision of items of information about a magnetic offset resulting from the different device-fixed interference fields between the first and the second operating state, wherein the determination of the azimuthal alignment takes place in consideration of the magnetic offset.

In one embodiment of the method according to the invention, the first and the second operating state of the measuring device differ from one another at least with respect to a present state of an electrical system of the measuring device, in particular in that an electrical system of the measuring device is turned on or off, and the recognition of the first and second operating states of the measuring device comprises at least a recognition of a present state of the electrical system.

The electrical system is in this case in particular a night vision system or a display unit, in particular having an LCD display screen, has a brightness regulator, or is a GPS module or a Bluetooth module.

According to a further embodiment of the method, the recognition of the present state of the electrical system comprises an ascertainment of a present current strength and/or voltage in the electrical system, in particular wherein the items of information about the magnetic offset are provided based on at least one ascertained current strength and/or voltage.

In one embodiment of the method according to the invention, the first and the second operating state of the measuring device differ from one another at least in that a hard-magnetic component of the measuring device has a different position, and the recognition of the first and second operating states of the measuring device comprises at least a recognition of a present position of the hard-magnetic component. In this case, the hard-magnetic component is in particular a mechanical switch, in particular a toggle, rotating, or sliding switch to be actuated by a user, or an element movable in a motorized manner, in particular an optical element movable in the scope of a zoom procedure.

According to a further embodiment, the method comprises a recognition of a change from the first operating state into the second operating state, in particular wherein the recognition of the change comprises a detection of turning on or off of an electrical system of the measuring device, and/or a position change of a hard-magnetic component of the measuring device.

According to one preferred embodiment of the method, in the scope of the initial compensation, initial compensation data are ascertained and stored, in the second operating state of the measuring device, magnetic field raw data are detected by the magnetic compass, and also the magnetic offset and the magnetic field raw data are used to compute magnetic field offset data, wherein the determination of the azimuthal alignment is performed based on the initial compensation data and the magnetic field offset data.

The invention additionally relates to a computer program product having program code which is stored on a machine-readable carrier, for executing the method according to the invention, in particular when the program is executed on an electronic data processing unit designed as a compensation unit of the measuring device according to the invention.

The invention will be explained in greater detail hereafter on the basis of figures. In a schematic illustration:

Figure 3A:
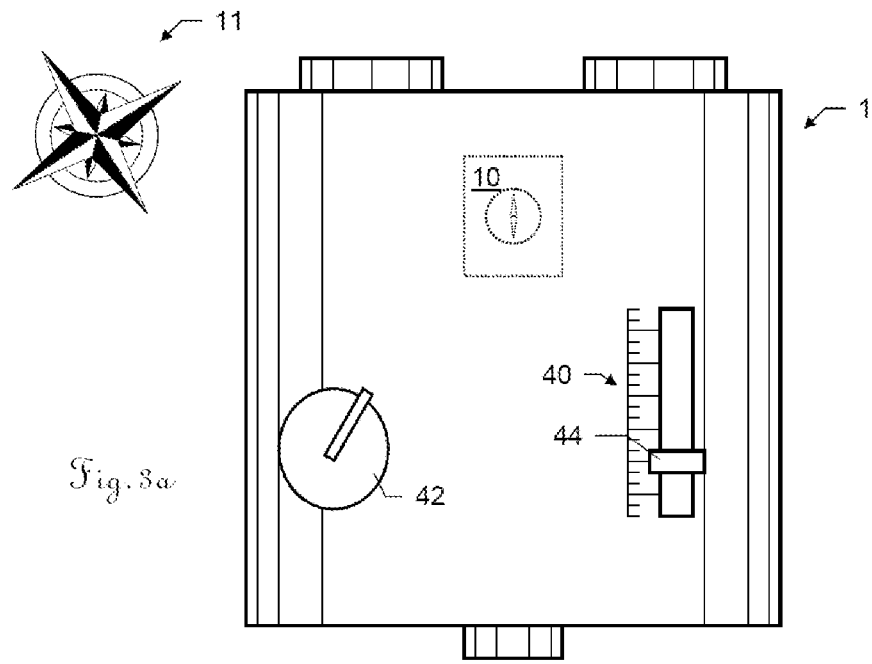
Figure 3B:
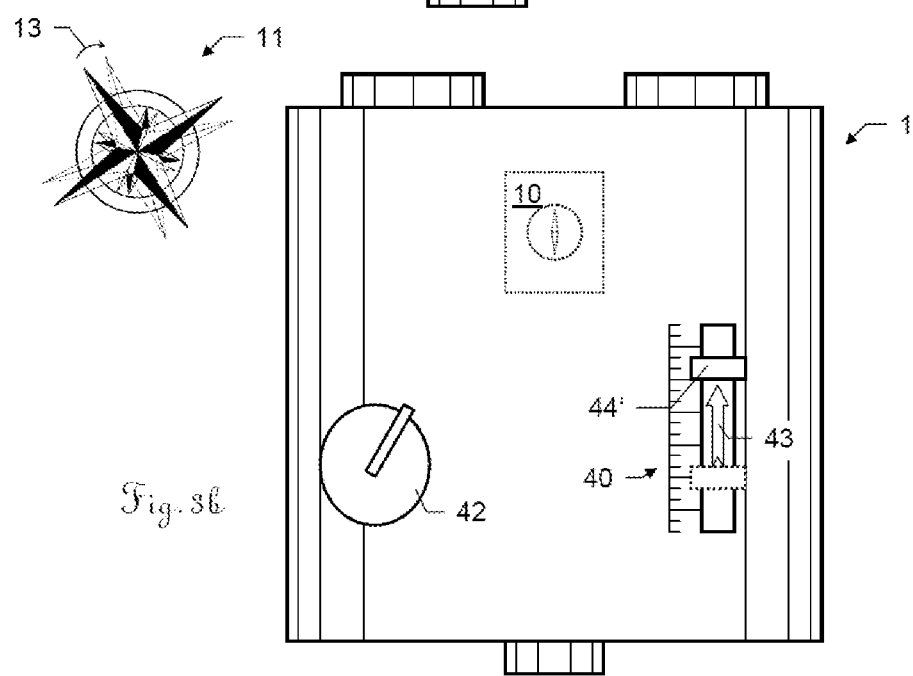
Figure 4:
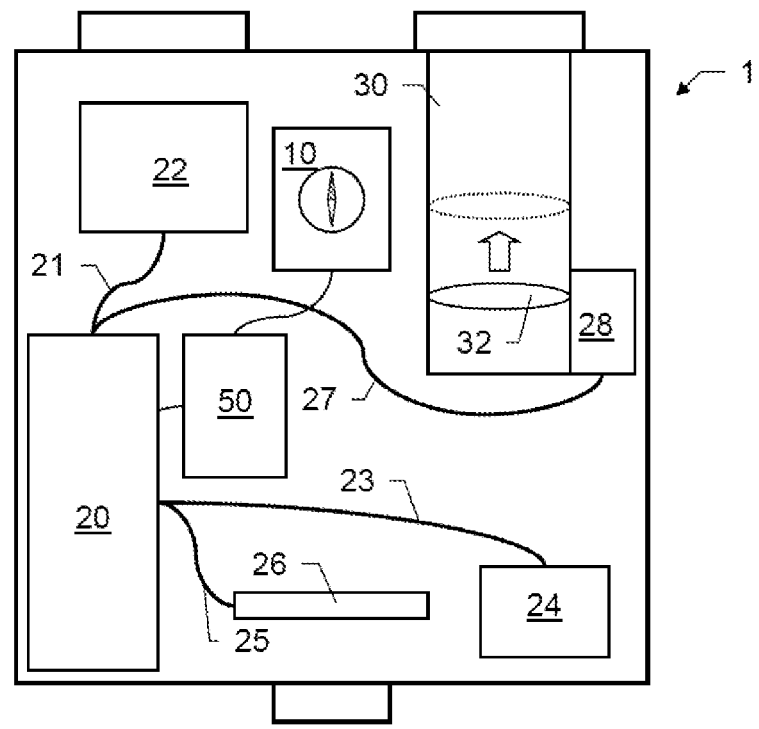
Figure 5A:
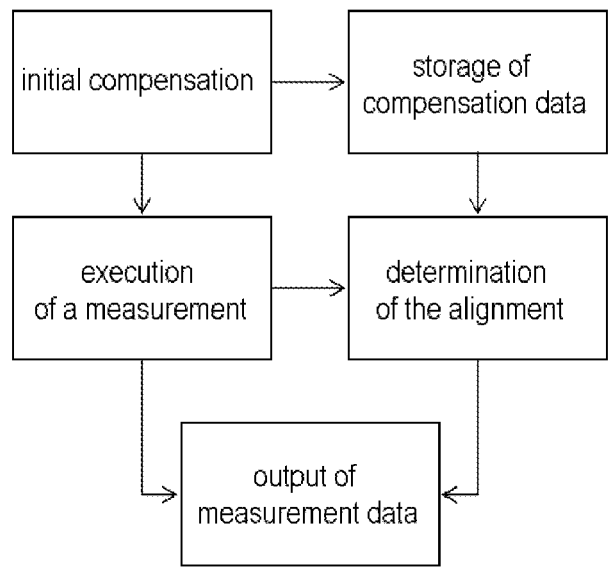
Figure 7:
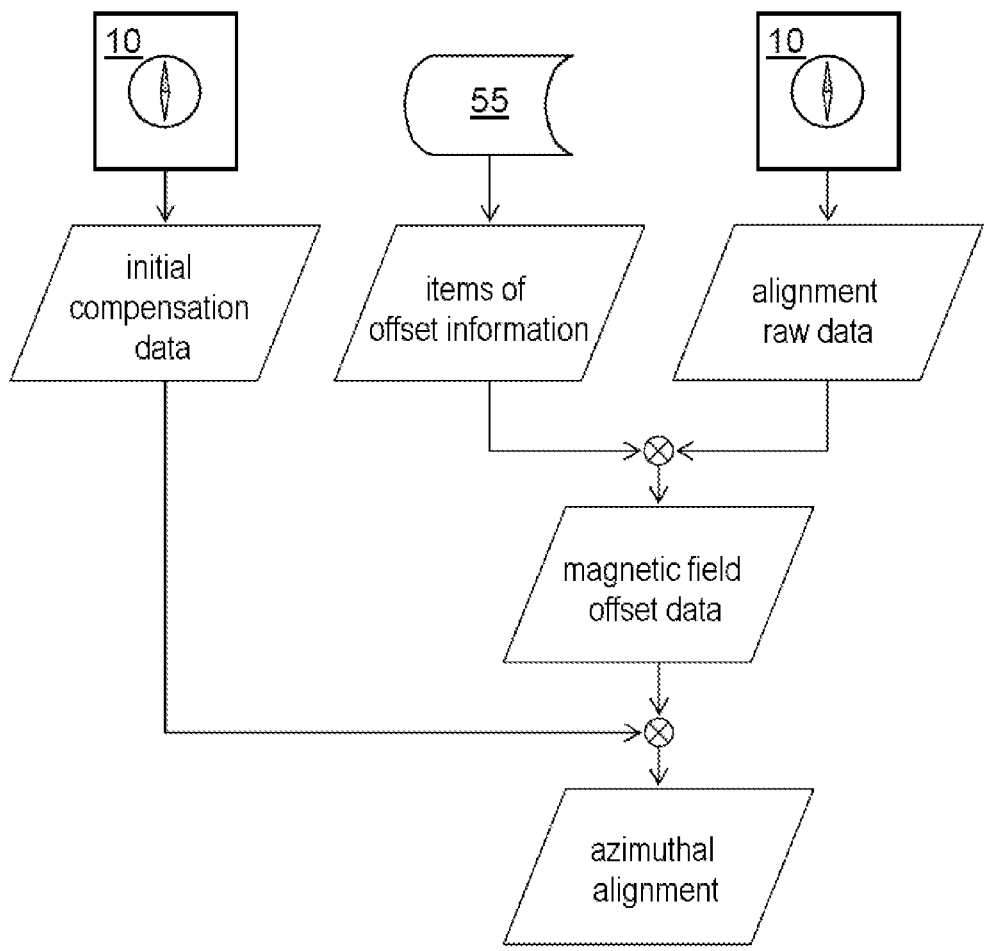

FIGS. 3a-b show two exemplary operating states of a measuring device according to the invention each having a different device-fixed interference field;

FIG. 4 shows an exemplary arrangement of electrical systems, which impair the device-fixed interference field, of a measuring device according to the invention;

FIGS. 5a-b show flow charts to illustrate two methods of the prior art for determining an azimuthal alignment;

FIG. 6 shows a flow chart to illustrate an exemplary embodiment of a method according to the invention for determining an azimuthal alignment; and FIG. 7 shows an exemplary computation path for determining the azimuthal alignment in the scope of a method according to the invention.

Figure 1:
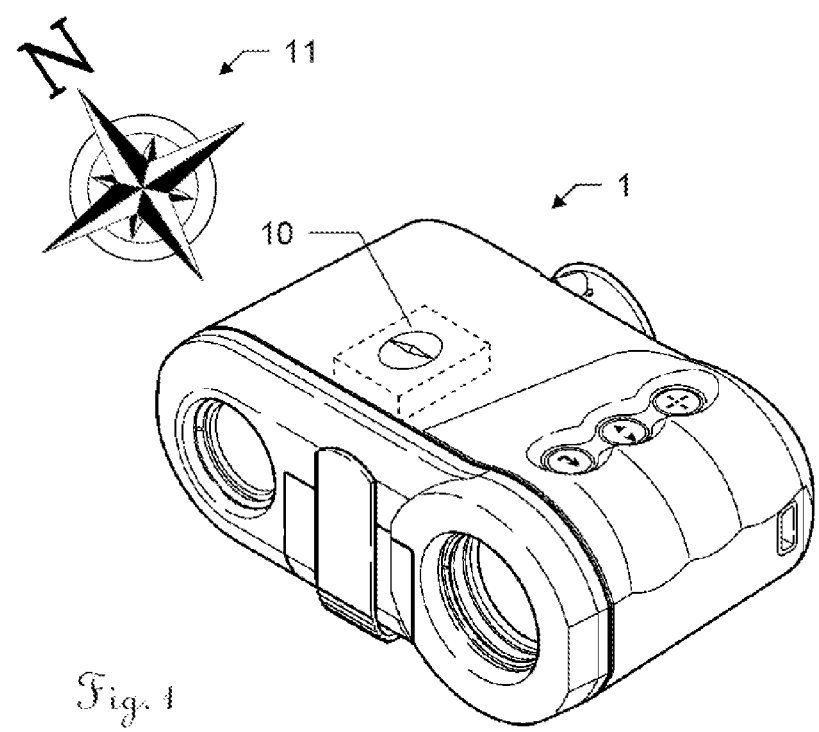
FIG. 1 shows an exemplary embodiment of a measuring device according to the invention having magnetic compass.

FIG. 1 shows an exemplary optoelectronic measuring device 1 according to the invention. The measuring device 1, which is shown here solely by way of example, is embodied as a handheld observation device for observing a target object and for detecting coordinates of the target object. For this purpose, it has, inter alia, a magnetic compass 10 for determining an azimuthal alignment of the measuring device 1 in relation to the Earth's magnetic field 11. For example, the DMC series from Vectronix is usable as the magnetic compass 10 for such a device according to the invention. The measuring device 1 additionally has a compensation functionality for carrying out a compensation of the magnetic compass 10 before a detection of coordinates.

Figure 2:
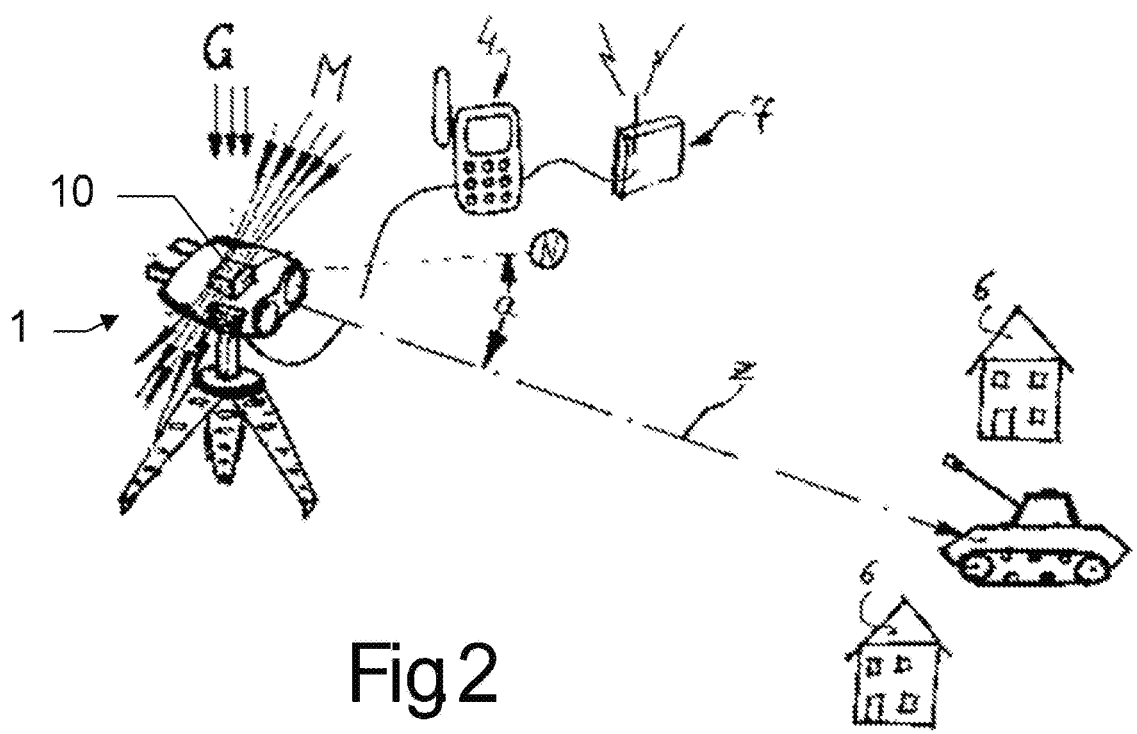
FIG. 2 shows an exemplary measuring arrangement for determining target coordinates of a remote object using a measuring device having magnetic compass on a tripod.

FIG. 2 shows an exemplary measuring arrangement for determining target coordinates of a remote target object 5. The measuring arrangement has a measuring device 1, which is fastened on a tripod made of amagnetic material, a GPS receiver 4, and a transmission unit 7. The target object 5 is formed here by a tracked vehicle, which has reached a position adjacent to a house 6. The components GPS receiver 4 and transmission unit 7, which are shown here as external devices, can alternatively also be integrated into the measuring device 1.

In the measuring device 1, which is designed here as an observation device and has aiming binoculars having an aiming axis Z, a laser distance meter and a digital magnetic compass 10 are integrated. In contrast to the laser distance meter, the digital magnetic compass 10 is indicated in the drawing as a small cuboid within the binoculars. Via the digital magnetic compass 10, which here has three magnetic field sensors arranged fixedly on the device for three-dimensionally measuring a magnetic field M and two inclination sensors for measuring the direction of the gravitational field G of the Earth, the azimuthal alignment a of the measuring device 1 is determined in relation to a computed north direction N and its zenithal alignment is determined in relation to a vertical.

In the computed north direction N, the declination—which is location-dependent at a regional scale—of the Earth's magnetic field in relation to the geographical north direction is taken into consideration. In a way known per se, this can be performed practically automatically by transmitting a declination value specific to the respective region from the GPS receiver 4 to the measuring device 1.

Like the consideration of the correct declination value, a correct compensation of device-fixed interference fields is a basic requirement for a correct determination of the azimuthal alignment, because device-fixed interference fields are located in the immediate vicinity of the magnetic compass 10 and therefore unconsidered changes of device-fixed interference fields can cause substantial azimuthal errors. Device-fixed interference fields are also taken into consideration here in the computed north direction N.

Because, in this measuring arrangement, the device-fixed interference fields are correctly compensated for and no location-fixed interference fields of local scale are located in the vicinity of the measuring device 1, there is a substantially homogeneous magnetic field M, in which azimuthal alignments a can be correctly determined in relation to one another without circle errors. This homogeneity is additionally increased by the fastening of the measuring device 1 on the tripod, because the magnetic compass 10 can only be moved within a very small measuring space of a few centimeters.

Location-fixed magnetic interference fields of regional scale, which cause a constant azimuthal error, can be detected and coarsely estimated to estimate the accuracy of azimuthal alignments a. In this method, using the digital magnetic compass 10, during a determination of an azimuthal alignment a, at least one field variable of the magnetic and gravitational fields G and M, the magnetic inclination here, is provided simultaneously. Because the measurement location is known to the measuring device 1 here, for example via the GPS receiver 4, the measured magnetic inclination can be judged automatically using the regional location-dependent magnetic inclination of a model of the Earth's magnetic field—the IGRF model here—in consideration of a predetermined threshold value and an accuracy of the azimuthal alignment a can be established.

If the difference between the magnetic inclination measured during the determination of the azimuthal alignment a and the magnetic inclination of the IGRF model in comparison to the threshold value is significant, a location-fixed magnetic interference field of regional extent is thus present. In this case, the estimation of the accuracy of the azimuthal alignment a is to be adapted accordingly by the measuring device 1.

In contrast, if the difference in comparison to the threshold value is insignificant, no significant, location-fixed magnetic interference field of regional extent can thus be present. Because in addition no location-fixed interference field of local scale is present here in the vicinity of the measuring device 1 and the declination and the device-fixed interference fields are taken into consideration correctly, according to a further method, the accuracy of azimuthal alignments a can be established according to a compensation accuracy. This results from the arithmetic compensation of device-fixed interference fields and represents a highest limit for the achievable accuracy of azimuthal alignments a, if device-fixed interference fields are present and they are compensated for during the determination of azimuthal alignments a. In the present measuring arrangement without location-fixed interference fields, the accuracy of azimuthal alignments a is determined in good approximation by the compensation accuracy.

The arithmetic compensation of device-fixed interference fields is performed according to the disclosure of DE 196 09 762 C1 via a vector equation, the parameters of which were determined by means of an optimization method. The optimization method is based on values of a predetermined sequence of measurements of the magnetic and gravitational fields M and G, in which sequence the measuring device 1 is aligned differently in space in each case at a measurement location. The compensation accuracy is estimated with the aid of a method of statistical regression computation, which is based on the values of the sequence of measurements in consideration of the established parameters of the vector equation.

After the azimuthal alignment a of the measuring device aligned on the target object 5 is determined, a signal is provided at an interface of the measuring device 1, which signal, inter alia, comprises the determined azimuthal alignment a and the estimated accuracy thereof. The provided signal is transmitted to the GPS receiver 4, taken into consideration there in the computation of the target coordinates and the estimated accuracy thereof, and transmitted via the transmission unit 7 to a fire control unit (not shown here). Instead of a military fire control unit, in particular in the case of civilian applications, the receiver can also be a geographic information system (GIS) or another data processing system or device, in particular a handheld smart phone or a tablet computer.

The accuracy can be estimated relatively reliably on the basis of methods implemented in the measuring device 1 for estimating the accuracy of the azimuthal alignment a. Possible collateral damage to the house 6 can thus be recognized in a timely manner in the event of a fire action planned against the target coordinates.

Electronic measuring devices 1 like the observation device shown in FIG. 1 generally have a variety of possible operating states. These operating states can result in differently pronounced interference of the magnetic field, which results in a different specification of the azimuthal alignment by the magnetic compass. Possible causes of such magnetically variable states of a measuring device are illustrated in FIGS. 3*a, b* and 4.

In this case, FIGS. 3*a* and 3*b* show an observation device 1 in a top view. The magnetic compass 10, which is integrated in the interior of the device, is illustrated by dotted lines. Two switches 40, 42, which are displaceable by hand by a user of the device, and which entirely or partially consist of hard-magnetic materials, are shown here on the observation device 1 by way of example: a sliding switch 40, for example for the continuous adjustment of a zoom factor, and a rotating switch 42, for example for turning a night vision operation on and off. The two switches 40, 42 in this case each assume a first position in FIG. 3*a*.

If a compensation of the magnetic compass 10 is carried out in this operating state of the device 1, i.e., with these positions of the two switches 40, 42, a high-accuracy determination of the azimuthal alignment on the basis of the magnetic field 11 is also only thus possible in this operating state.

FIG. 3*b* shows a situation in which the sliding switch 40 has been moved from the first position 44 (see FIG. 3*a*) by a sliding movement 43 (in particular manually executed by a user) into a second position 44'. Due to the hard-magnetic properties of the switch 40, the device-fixed interference field changes as a result. The magnetic field 11 is therefore ascertained by the magnetic compass 10 with a certain deviation, the offset. This offset 13 describes in this case the difference of the ascertained magnetic field between the device state during the initial compensation and the device state during the coordinate measurement.

Due to the occurring offset 13, in devices and methods of the prior art, a new compensation actually has to be performed now, which would be time-consuming and therefore often burdensome to the user, however. The lack of knowledge about the necessity of a renewed compensation or the laboriousness of the method often has the result that the user does not carry out a renewed compensation, which reduces the accuracy of the compass 10.

According to the invention, the device therefore has a compensation unit, which is designed to detect the operating state of the device and—depending on a first operating state during the compensation and a present operating state—to compute a magnetic offset value or to retrieve it from a data memory of the compensation unit. This offset value is then taken into consideration in the ascertainment of the actual azimuthal alignment of the device 1.

With reference to FIGS. 3*a* and 3*b*, this means that firstly the positions of the two switches 40, 42 are automatically detected during the compensation. Subsequently, the positions are detected further, so that the position change 43 and/or the new position 44' of the sliding switch 40 is recognized. The offset 13 resulting therefrom is stored in a memory of the compensation unit and can be retrieved therefrom if needed and used to determine the alignment. The detection of the positions can be performed both continuously progressively and also as required. In this case, as required means in particular that the positions are at least always detected when a compensation or a measurement is carried out. Alternatively, a position change can also be monitored, wherein the device state is also only updated in the event of a recognized change, for example.

FIG. 4 shows the measuring device 1 in a schematic cross section with exemplary internal components. The illustrated internal components comprise, on the one hand, the magnetic compass 10 having a compensation unit 50 assigned thereto and, on the other hand, possible hard-magnetic interference sources, which can negatively influence the determination of an azimuthal alignment by the magnetic compass 1. A power source in the form of a battery 20 and as consumers, solely by way of example, a night vision device 22, a GPS module 24, an LCD display screen 26, and a motor 28 for actuating a zoom device 30 are shown. An electrical line 21, 23, 25, 27 extends between the battery 25 and each of the consumers 22, 24, 26, 28.

Both the lines and also the consumers represent possible electrical interference sources 21-28 for the magnetic compass 10 as activatable electrical systems. If a compensation of the device 1 is carried out in a state in which the GPS module 24 and the LCD display screen 26 are turned on, i.e., corresponding currents flow through the electrical lines 23, 25 to the two consumers, these hard-magnetic interference sources are compensated for, so that the magnetic compass 10 reliably functions in this state of the device 1.

However, if the night vision device 22 is put into operation thereafter, additional currents flow through the line 21. This additional, uncompensated interference source causes a faulty measurement of the magnetic compass 10.

In addition, the night vision function can cause an increased power consumption of the LCD display screen 26, whereby the interference source of the current flow to this electrical system becomes greater.

In this embodiment, the device also has a compensation unit 50, which is embodied for the purpose of detecting the operating state of the device and computing a magnetic offset value and/or retrieving it from a memory depending on a first operating state during the compensation and a present operating state. In this embodiment, the compensation unit 50 is designed for the purpose of detecting the state of the individual electrical systems. The interfering influence of each of these systems both in the turned-on and also turned-off state on the magnetic compass 10 is known and is preferably stored at the factory in a memory of the compensation unit 50.

With reference to the above-described example, this means that the compensation unit 50 recognizes that during the compensation the GPS module 24 and the LCD display screen 26 are turned on, and subsequently a further device is put into operation with the night vision device 22, which impairs the magnetic compass 10 in the turned-on state. The difference of the impairments, i.e., the additional impairment by the turned-on night vision device 22 here, is stored as an offset value in the memory of the compensation unit 50 and is used to ascertain the present azimuthal alignment.

The zoom device 30 has a displaceable optical element 32 here. This can also be partially hard-magnetic. A position of the optical element 32 is therefore preferably also detectable by the compensation unit 50 and corresponding offset values are provided in retrievable form in the memory.

A present current strength or voltage in the electrical systems or lines can optionally also be detectable. Because, for example, the LCD display screen 26 consumes different amounts of current depending on a brightness of the display, the interfering influence of the display screen 26 and its electrical line 25 accordingly results differently depending on the presently displayed brightness. A value for the offset can thus be provided with finer gradations than on/off or even continuously, to enable still more accurate ascertainment of the present alignment. For example, the state can be described using an integer value, wherein either at least one offset value can be assigned to each integer value (for example, in each case the offset in relation to a value of zero), or an offset value can be computed from the integer value.

Firstly, exemplary methods of the prior art for determining an azimuthal alignment are illustrated in FIGS. 5a and 5b by means of flow charts.

FIG. 5a shows a method in which, after the first compensation at the location of the measurement (initial compensation), a measurement is performed directly without change of the operating state. After execution of the initial compensation, corresponding compensation data are stored. After execution of the actual measurement, these compensation data are used to determine the azimuthal alignment of the device, which is necessary for the computation of the measurement data. The measurement data are output to the user.

FIG. 5a shows a method in which, after the initial compensation, a change of the operating state occurs, and an additional compensation is carried out. After execution of the initial compensation, corresponding compensation data are also stored here. The operating state of the device is then changed so that the device-fixed interference field changes. For example, an activatable electrical system is turned on or off, or a hard-magnetic component of the device is displaced. If the user recognizes the necessity at all, a renewed compensation is now carried out. The already stored compensation data are obsolete and are overwritten by new data. After execution of the actual measurement, these new compensation data are used to determine the azimuthal alignment of the device, which is required for computing the measurement data. The measurement data are output to the user as usual.

FIG. 6 shows a flow chart to illustrate a method according to the invention. This also begins with an initial compensation at the location of the measurement. Corresponding compensation data are stored. If the operating state is now changed so that the device-fixed interference field changes, this is detected according to the invention. Depending on the change, a corresponding offset value, which represents the change of the device-fixed interference field and is stored at the factory in a memory of the device, is retrieved from this memory as soon as the actual measurement is performed. In consideration of the original compensation data and the offset, the alignment can then be determined without a renewed compensation having to be performed. The alignment is used to compute the measurement data which are displayed to the user.

FIG. 7 illustrates the data flow in an exemplary embodiment of the method. In this case, firstly the initial compensation data are provided by the magnetic compass 10 and stored. The memory unit 55 of the compensation unit provides the corresponding items of offset information upon an ascertainment of an operating state change. Upon triggering of the measurement, the (uncompensated) alignment raw data are ascertained by the magnetic compass 10. Magnetic field offset data are then firstly computed from the items of offset information and the alignment raw data. The azimuthal alignment can then finally be ascertained by means of the initial compensation data from these magnetic field offset data.

It is apparent that these illustrated figures only schematically illustrate possible exemplary embodiments. The various approaches can also be combined with one another and with methods and devices of the prior art.

The invention claimed is:

1. An optoelectronic measuring device comprising:
an electronic magnetic compass for determining an azimuthal alignment of the measuring device; and
a compensation unit, which is associated with the magnetic compass, for compensating for device-fixed interference fields, wherein
the measuring device is adapted to assume at least two defined, repeatable operating states, wherein the measuring device has a different device-fixed interference field in each of the operating states, and
the compensation unit has a compensation functionality configured to carry out an initial compensation of the electronic magnetic compass in a first operating state of the measuring device, wherein the compensation unit has a detection unit configured to detect a present operating state of the measuring device, a memory unit configured to store a magnetic offset resulting from the different device-fixed interference fields between the first operating state and a second operating state of the measuring device, and a computer unit configured to compute the azimuthal alignment of the measuring device depending on a detected operating state and based on the magnetic offset.

2. The measuring device according to claim 1, wherein the measuring device is a handheld optoelectronic observation device having
a display unit configured to display measurement data comprising the azimuthal alignment, and/or an interface for providing a signal which comprises information about the azimuthal alignment for an external receiver, a geographical information system, a military fire control unit, or a handheld data processing device.

3. The measuring device according to claim 1, further comprising:
at least one activatable electrical system, wherein the first and the second operating state of the measuring device differ from one another at least with respect to a present state of the electrical system, and
the detection unit is configured to recognize the present state of the electrical system, wherein the activatable electrical system is a night vision system, is a display unit having an LCD display screen, has a brightness regulator, is a GPS module, or is a Bluetooth module.

4. The measuring device according to claim 3, wherein
the first and the second operating state of the measuring device differ from one another in current strength and/or voltage in the electrical system, and
the detection unit is configured to determine current strength and/or voltage in the electrical system.

5. The measuring device according to claim 1, further comprising:
at least one hard-magnetic component, which is adapted to assume at least two different positions in or on the measuring device,
wherein the first and the second operating state differ from one another in that the hard-magnetic component has a different position in each case, wherein the hard-magnetic component is a mechanical switch, is a toggle, rotating, or sliding switch to be actuated by a user, is an element movable in a motorized manner, or is an optical element movable in the scope of a zoom procedure.

6. The measuring device according to claim 1, wherein the compensation unit is configured to instruct a user of the measuring device to execute the initial compensation using an output of handling instructions on a display unit of the measuring device.

7. The measuring device according to claim 1, wherein the magnetic compass has at least three measuring sensors arranged fixedly on the device for measuring a magnetic field and the direction of the gravitational field.

8. The measuring device according to claim 1, wherein the measuring device has a different hard-magnetic device-fixed interference field in each case in the first and in the second operating state.

9. A method for determining an azimuthal alignment of an optoelectronic measuring device, wherein the measuring device has a magnetic compass and is adapted to assume a plurality of defined, repeatable operating states each having a different device-fixed interference field, wherein the method comprises:
 initially compensating the electronic magnetic compass in a first operating state of the measuring device, and
 determining the azimuthal alignment of the measuring device by means of the magnetic compass in a second operating state of the measuring device, further comprising:
 automatically recognizing the first operating state and the second operating state, and
 automatically provisioning items of information about a magnetic offset resulting from the different device-fixed interference fields between the first and the second operating state,
 wherein the determination of the azimuthal alignment takes place in consideration of the magnetic offset.

10. The method according to claim 9, wherein the first and the second operating state of the measuring device differ from one another at least with respect to a present state of an electrical system of the measuring device, and
 the recognition of the first and second operating states of the measuring device comprises at least a recognition of a present state of the electrical system, wherein the electrical system is a night vision system, is a display unit having an LCD display screen, has a brightness regulator, is a GPS module, or is a Bluetooth module.

11. The method according to claim 10, wherein the recognition of the present state of the electrical system comprises ascertaining current strength and/or voltage in the electrical system, wherein the items of information about the magnetic offset are provided based on at least one ascertained current strength and/or voltage.

12. The method according to claim 9, wherein the first and the second operating state of the measuring device differ from one another at least in that a hard-magnetic component of the measuring device has a different position, and
 the recognition of the first and second operating states of the measuring device comprises at least a recognition of a present position of the hard-magnetic component, wherein the hard-magnetic component is a toggle, rotating, or sliding switch to be actuated by a user, is an automatically movable element, or is an optical element movable in the scope of a zoom procedure.

13. The method according to claim 9, further comprising:
 recognizing a change from the first operating state into the second operating state, wherein the recognition of the change comprises detecting turning on or off of an electrical system of the measuring device, and/or a position change of a hard-magnetic component of the measuring device.

14. The method to claim 9, wherein
 in the scope of the initial compensation, initial compensation data are ascertained and stored,
 in the second operating state of the measuring device, magnetic field raw data are detected by the magnetic compass,
 the magnetic offset and the magnetic field raw data are used to compute magnetic field offset data, and
 the determination of the azimuthal alignment is performed based on the initial compensation data and the magnetic field offset data.

15. A computer program product having program code which is stored on a machine-readable carrier, for determining an azimuthal alignment of an optoelectronic measuring device, wherein the measuring device has a magnetic compass and is adapted to assume a plurality of defined, repeatable operating states each having a different device-fixed interference field, wherein the program code comprises:
 code for initially compensating the electronic magnetic compass in a first operating state of the measuring device, and
 code for determining the azimuthal alignment of the measuring device by means of the magnetic compass in a second operating state of the measuring device, further comprising:
 code for automatically recognizing the first operating state and the second operating state, and
 code for automatically provisioning an automatic provision of items of information about a magnetic offset resulting from the different device-fixed interference fields between the first and the second operating state,
 wherein the determination of the azimuthal alignment takes place in consideration of the magnetic offset.

* * * * *